United States Patent Office
3,371,197
Patented Feb. 27, 1968

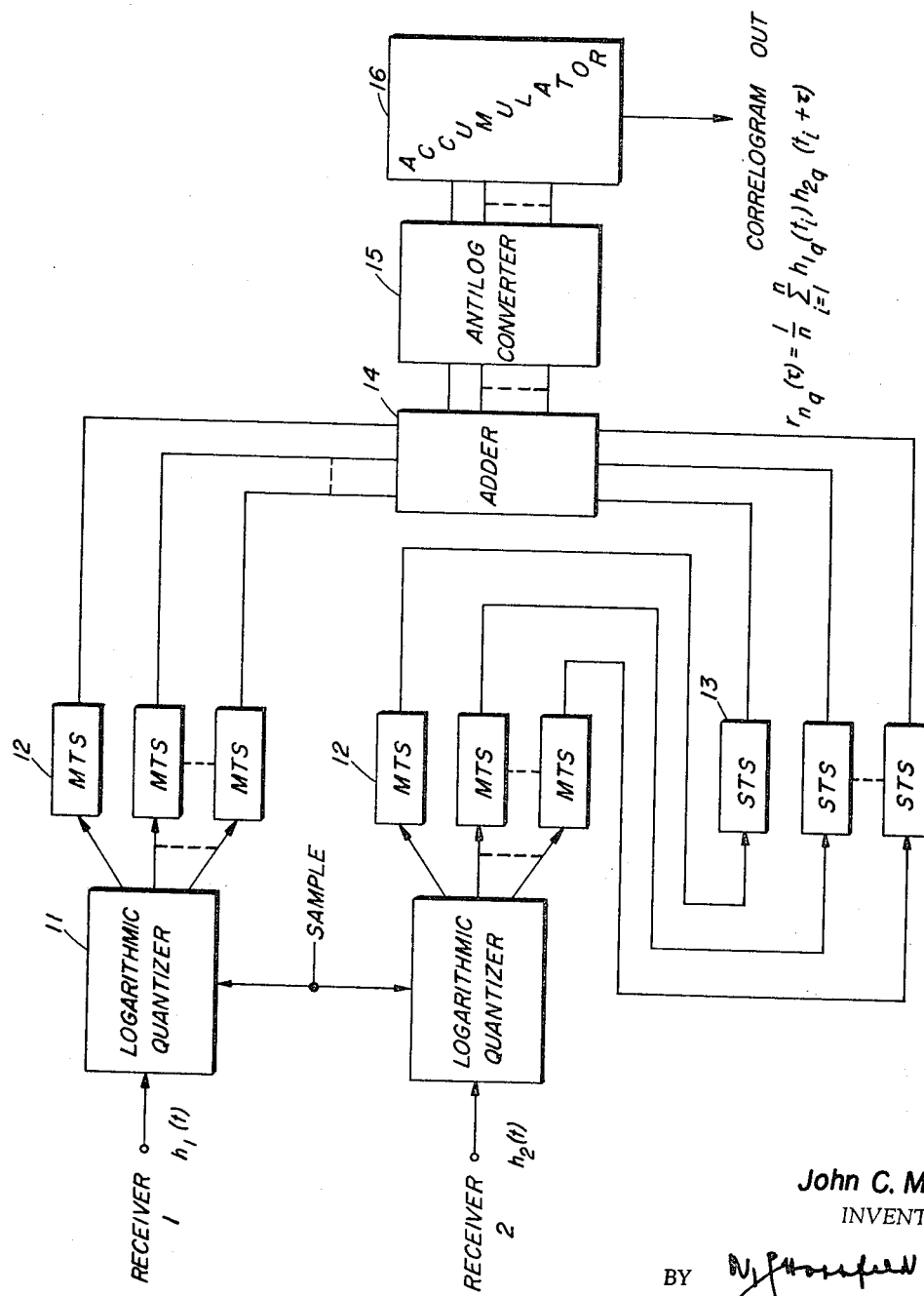

3,371,197
REAL TIME DIGITAL MULTIPLIER CORRELATOR USING LOGARITHMIC QUANTIZATION AND MULTIPLICATION
John C. Munson, Silver Spring, Md., assignor to the United States of America as represented by the Secretary of the Navy
Filed Jan. 31, 1964, Ser. No. 341,809
5 Claims. (Cl. 235—181)

ABSTRACT OF THE DISCLOSURE

A system for determining the time delay between signals derived from a common transient signal and arriving at separate receivers in the presence of independent background noise at the receivers. First and second signal channels are connected to receive the signals and have their output connected to logarithmic quantizers. The quantizers provide logarithmic bits of information corresponding to the sampled electrical signals. Deltic processing means are coupled to the outputs of the quantizers for delaying the signals before they are summed and fed to an antilog converter. An accumulator is connected to said converter for integrating the resultant antilog signal necessary to provide correlograms of the input signals.

---

The invention described herein may be manufactured and used by or for the Government of the United States of America for governmental purposes without the payment of any royalties thereon or therefor.

The present invention relates generally to multiplier correlators and more specifically to a real-time digital multiplier correlator which uses time compression sampling and performs multiplication using logarithms to achieve the necessary system speed for real-time presentation of the correlogram.

The analysis of time functions by means of correlation techniques finds application in reconnaissance identification of unknown electro-magnetic and acoustic transmissions, and the transmission of information at signal-to-noise ($S/N$) ratios much less than unity. In many applications it would be advantageous to have the correlation function instantaneously available or produced with negligible delay. This is commonly referred to as "real-time operation."

One advantage of the multiplier correlator derives from the heavy weighting given to the large amplitudes, which emphasizes the signal, particularly if the $S/N$ ratio is greater than one during the time the signal is present. The integration time ideally should be chosen equal to the expected signal duration. However, if $S/N$ is much greater than one during the time the signal is present this is not at all critical.

The difficulty of performing real-time correlation is evident when considering the definition of the correlation function itself. In certain types of detection systems it is necessary to obtain the time difference between two received signals $h_1(t)$ and $h_2(t)$ and the cross correlation function of the above signals is defined as a finite time average by the following equation:

$$r_n(\tau) = \frac{1}{n}\sum_{i=1}^{n} h_1(t_i) h_2(t_i + \tau) \qquad (1)$$

where $\tau$ is the delay parameter between signals and $n$ is equal to number of times the incoming signals are sampled. From the definition of Equation 1, it can be shown that there are three operations involved in the evaluation of $r_n(\tau)$:

(1) Delay in time of one function with respect to the other;
(2) Multiplication of the delayed function by the undelayed function;
(3) Averaging the product in time.

Since the observation time is necessarily finite, the correlation function must be approximated by a finite average. In most applications it is sufficient to compute $r_n(\tau)$ for a number of discrete values of the delay parameter $\tau$, spaced closely enough to permit the continuous correlation function to be obtained by interpolation between these computed values. Using the finite average approximation, the primary difficulties which limit the speed in determining the correlation for each delay are those of obtaining access to the stored history of $h_1(t)$ and $h_2(t)$ and performing the multiplication over this history. These basic difficulties are then compounded since it is necessary to continuously repeat these operations and process all of the input signal data for the delays $\tau$.

Two general methods are in use today for producing fast multiple processing. In multiple parallel processing, one processing unit is used for each value of delay $\tau$ processed. In correlation computation, the processing unit will be a multiplier and averager and a processing unit will be required for each different value of relative delay. The individual processing units must be capable of handling only the bandwidth of the input signal. The number of correlation points which can be obtained for each repetition of the data is simply equal to the number of processing units. This makes it theoretically possible to obtain all the necessary points simultaneously in the time it takes to compute a single one of them by simply providing a processor per point. In practice, however, the parallel scheme is useful if only a few relatively simple operations need be performed.

Another method of correlation has been that performed by the so-called time compression systems. These systems repeat the signal at a faster rate than it was recorded to enable many repetitions to be processed in a short time. Time compression can be achieved, for example, by recording the data on magnetic tape and using a scanning head to effectively play the data back in a much shorter time than was required to record it. If desired, the data may be sampled and stored in a digital memory whose contents can be rapidly and repetitively scanned. When using the time compression method it is necessary that the single processing unit have increased bandwidth relative to those units used in the parallel scheme. This results since all frequencies in the input signal are effectively increased in proportion to the compression ratio of the system.

One type of time compression system employing digital memory is described in Patent No. 2,958,039 issued to Victor C. Anderson on October 25, 1960. The term deltic is an abbreviation for a delay line time compressor of the type described in the Anderson patent. However, as will be seen hereinafter, the loss of information in the operation of the present invention is due to quantizing and sampling while the information loss in the Anderson patent is attributed to clipping and sampling. The deltic time compression scheme makes available signal processing methods such as spectrum analysis and cross or auto correlation analysis which enhance the $S/N$ ratio of the incoming signals.

One of the methods of determining the time difference of arrival of the above two received signals is by polarity coincidence correlation and employs the deltic discussed in the Anderson patent. In this method two given portions of the incoming alternating signals are sampled at regular intervals to determine the polarity at those points, and a digital pulse indication of the polarity of the signal at each of these points is produced. The polarity indications for each of the signals are then placed in separate circulating memories (deltics) and a small delay is introduced into one of the circulating memories. The slight delay in one of the deltics causes that series of pulses to be shifted in time with respect to the series of pulses in the other deltic once during each complete circulation thereof. Thus, the series of pulses in one memory, the moving time series, is shifted continuously with respect to the other deltic series, the stationary time series, until the two series have been compared in a number of possible time positions with respect to each other. The number of polarity agreements sensed by the coincidence circuit in a given circulation will be largest during the particular circulation in which the delay of one series is equal to the time displacement between the two incoming signals. The output of the coincidence circuit may be integrated for each circulation of a pulse series to show the particular circulation which produces the greatest coincidence between the two signals. If the output from the integrator is smoothed by appropriate circuitry, the device will produce an analog signal known as an analog correlation function whose peak is indicative of the time difference between the two signals. Parallel deltics may be employed with each deltic carrying one bit of a binary number since with a deltic the contents are automatically scanned due to the dynamic nature of the data storage.

The deltic circulating loop wherein a slight delay is introduced to cause the series of pulses to be shifted in time is commonly referred to as a moving time series (MTS). The deltic in which the series of pulses is not shifted continuously is commonly referred to as the stationary time series (STS).

In performance of the above-cited methods digital rather than analog storage was chosen due to the inherent errors in analog storage and multiplication. Digital storage implies quantization. If the quantization is done such that the logarithm of the input is obtained rather than quantizing the input signal in uniform increments as is done customarily, two salutary effects are obtained: (1) Multiplication of the two inputs is accomplished by adding the logarithms of the two inputs, and (2) the sampling errors are reduced for the type of amplitude distributions normally encountered as compared with a constant interval quantization for the same distributions. Of these advantages the first is the more important for this application, since digital addition is a very simple process, while digital multiplication requires a number of operations. Since the maximum rate at which data can be processed depends upon the available time compression, which in turn normally depends on the maximum rate at which computations can be made, it is highly important to reduce the number of operations required to perform a multiplication. Thus the method of logarithmic quantization performed in the operation of the present invention has solved a significant problem in multiplier correlators.

An object of this invention is to provide a relatively simple method of determining the time difference between two signals arriving at two receivers where each receiver has an independently noisy background with a data reduction being done in real time.

Another object is to provide logarithmic quantization in a multiplier correlator which gives a constant percent RMS sampling error independent of signal amplitude and provides a wide dynamic range for the correlator with only a few bits of storage, depending on the fineness of the logarithmic base.

A further object of the invention is to provide an extremely simple method of performing antilog conversion in a multiplier correlator if the base of the logarithms used in quantization is made equal to the logarithmic quantizing interval.

A still further object of the invention is to provide a simple method of providing amplitude weighting using real-time multi-bit processing and employing parallel deltics.

Still another object of the invention is to provide a good general purpose real-time correlator using logarithmic multiplication and which permits very high computational speeds.

Other objects and features of the invention will become apparent to those skilled in the art as disclosure is made in the following description of a preferred embodiment of the invention as illustrated in the accompanying drawing which shows a block diagram of the complete system.

A pair of logarithmic quantizers are coupled respectively to the output of receiver 1 and receiver 2 and operate on the two signals $h_1(t)$ and $h_2(t)$. Without the quantizers 11 the function which the system would normally generate is set forth in Equation 1 above.

Equation 1 is approximated instrumentally in $$r_{nq}(\tau) = 1/n \sum_{i=1}^{n} h_{1q}(t_i) h_{2q}(t_i + \tau) \qquad (2)$$

$$r_{nq}(\tau) = 1/n \sum_{i=1}^{n} \log_a^{-1} \left[ \begin{array}{l} \log_a h_{1q}(t_i) + \\ \log_a h_{2q}(t_i + \tau) \end{array} \right] \qquad (3)$$

where $h_{Kq}(t_e)$ = quantized output of the $K^{th}$ detector at time $t_e$, and $a$ is the logarithmic base. The polarity of each sample is stored in one of the parallel deltics, and the proper polarity of the product of each sample pair is then generated at the output of the antilog converter.

The following table will be helpful in explaining the method of quantizing logarithmically. The ratio of successive quantized amplitudes has been chosen for this example to be 2, and the logarithmic base has similarly been chosen to be 2. The logarithms of all quantized numbers are integers, so that the data handling problems are greatly alleviated (particularly in the antilog converter). To illustrate the use of the table, if the input signal amplitude lies between 6 and 12 the quantizer calls it an amplitude of 8. The logarithm to the base 2 of 8 is 3, so that the logarithmic quantizer output is 3 whenever the input lies between 6 and 12. The principle for use with any desired logarithmic base is obvious.

| Input Signal Amplitude | 3/4 | 3/2 | 3 | 6 | 12 | 24 | 48 | 96 | 192 |
|---|---|---|---|---|---|---|---|---|---|
| Output Quantized Amplitude: $X_q$ | 1 | 2 | 4 | 8 | 16 | 32 | 64 | 128 | |
| $\log_2$ of Output Quantized Amplitude: $y$ | 0 | 1 | 2 | 3 | 4 | 5 | 6 | 7 | |

Thus by performing logarithmic quantization on the two incoming signals $h_1(t)$ and $h_2(t)$ the sum of the outputs of the stationary time series channels and the moving time series channels may be obtained by using adder 14. The sum of the quantized products set forth in Equation 2 is generated by taking the sum of the antilogs of the sum of the quantized logarithms.

The generation of the correlation function herein follows a process similar to that of the polarity coincidence correlation function using deltics described in the aforementioned Anderson patent. The output of one set of moving time series deltics (MTS) 12 is fed to a set of stationary time series deltics (STS) 13 to develop a precession delay. The output of the MTS deltics and STS deltics are added and passed through an antilog converter 15. The output of the antilog converter then is a train of products of the separate pairs of STS and MTS inputs, with the delay changing by one step every $n$ products. An appropriate set of $n$ consecutive outputs are stored in each register of the accumulator 16, with each register corresponding to a given delay.

An analog antilog converter and analog integration over the $n$ consecutive outputs could be employed rather than the antilog converter 15 and accumulator 16.

Two of the ways by which additional integration time could be obtained if desired would be either by piling up counts in the appropriate accumulator registers over a number of correlation sweeps, or else by using a standard postintegrator such as a dielectric recorder or digital postintegrator.

If the logarithmic base is chosen equal to the ratio of successive quantizing intervals, then the logarithms of the quantized receiver outputs will be whole numbers. The sum of the logarithms will then also be a whole number and the product will be a whole number power of the base. This makes antilog conversion very simple since no fractions are involved. The width of the basic quantizing interval which is used should be based on the dynamic range required, the sampling noise which can be tolerated, and the allowable equipment complexity. It is important to note that if the same basic quantization interval is maintained, adding one deltic channel (one digit to the logarithm) gives $20 \log_{10} b$ more than twice the dynamic range in decibels where $b$ is the base of the logarithm. If four deltics were used together with a logarithmic base of 2, the dynamic range would be 42 db. That is seen because one deltic contains the sign while the three others contain a number between 0 and 7, giving a maximum level of $2^7$ or 128. Since the smallest increment is one, the ratio of the largest amplitude to the smallest amplitude is $$\frac{128}{1} \text{ or } 42 \text{ db}$$

If five deltics are used, while retaining a base of 2, one more digit is available, giving the range of numbers from 0 to 15 to provide a maximum level of $2^{15}$. This gives a dynamic range of 90 db, which is 6 db more than twice 42 db which was obtained with four deltics. This is as expected since $20 \log_{10} 2$ equals 6 db.

Weighting of amplitudes can be achieved, if desired, by appropriately altering the characteristics of the input quantizer 11, the adder, or the antilog converter 15. It would be simpler to apply the weighting distortion at the quantizer, both because the logic is easily constructed to perform the weighting there, and because the data rate is slower at that point.

The present invention is not directed to nor does it include any detailed design of the elements of the multiplier correlator. The design of the present system using the techniques outlined above has been carried out using standard engineering practices, and the component elements of the block diagram shown are commercially available and well known to one skilled in the art.

It should be understood that the foregoing disclosure relates only to a preferred embodiment of the invention and that numerous modifications may be made therein without departing from the spirit and scope of the invention as set forth in the appended claims.

I claim:

1. A system for providing a real-time correlogram for an indication of the time difference between arrival of a signal at two separate receivers, each of which has an independent noisy background; said system comprises:
   quantizing means coupled to the output of each receiver for separately quantizing signals at the outputs thereof at intervals equal to the logarithm of the quantized amplitudes of the separate signals,
   means connected to said quantizing means for sampling said quantizing means at regular time intervals,
   a first moving time series deltic coupled to the output of one of said quantizing means to provide a precessing replica of the logarithm of a quantized portion of the signal at one receiver,
   a second moving time series deltic coupled to the output of the other of said quantizing means to provide a precessing replica of the logarithm of a quantized portion of the signal at the other of said receivers,
   a stationary time series deltic coupled to the output of said second moving time series deltic to provide a stationary replica of the logarithm of a quantized portion of the signal at said other receiver,
   means coupled to the outputs of said stationary time series deltic and said moving time series deltic for adding the output signals thereof and
   means coupled to the output of said adding means to provide a correlation of the signals received at each of said receivers.

2. The combination of claim 1 wherein said means coupled to said adding means further comprises,
   converter means for taking the antilog of the signals summed in said adding means,
   and accumulator means coupled to the output of said converter means for registering an indication of a predetermined number of consecutive products of said incoming signals at said receivers whereby the time difference in arrival of said signals may be determined.

3. The combination of claim 1 wherein
   the output of one of said quantizing means has coupled thereto a first plurality of moving time series deltics with each deltic carrying one bit of a binary number,
   a second plurality of moving time series deltics coupled to the output of said other quantizing means with each deltic carrying one bit of a binary number,
   a plurality of stationary time series deltics coupled to the output of said second plurality of moving time series deltics,
   and means coupling the output of said first plurality of moving time series deltics and the output of said stationary time series deltics to said adding means for adding the logarithms of the quantized amplitudes of the received signals.

4. The combination of claim 1 wherein
   said means coupling the output of said adding means comprises
   an analog antilog converter for providing an analog product signal and
   analog integration means coupled to said converter for performing the integration over the total number of consecutive sampled outputs for a given delay.

5. A real time multiplier correlator comprising
   a pair of processing channels each having means for receiving a common signal in the presence of an independent noisy background,
   a logarithmic quantizer connected to the output of each receiving means for quantizing said signals at intervals equal to the logarithm of the quantized amplitude of said signals, the base of said logarithm being an integer equal to the ratio of successive quantizing intervals of said signals,
   means coupled to each of said logarithmic quantizers for sampling the incoming signals passed therethrough at regular time intervals,
   a first plurality of moving time series deltics coupled to the output of one of said logarithmic quantizers, each of said plurality carrying one bit of a binary number and providing a precessing replica of the logarithm of a quantized portion of the input signal in one of said pair of processing channels,
   a second plurality of moving time series deltics coupled to the output of the other of said logarithmic quantizers, each carrying one bit of a binary number and providing a precessing replica of the logarithm of a quantized portion of the input signal in the other of said processing channels, a plurality of stationary time series deltics coupled to the outputs of said second plurality of moving time series deltics, each providing a stationary replica of the logarithm of a quantized portion of the incoming signal in said second processing channel, means coupled to the output of said stationary time series deltics and said first plurality of moving time series deltics for adding the output signals thereof, and means coupled to the output of said adding means to provide a correlogram of the signals received in each of said processing channels.

References Cited

UNITED STATES PATENTS

| | | |
|---|---|---|
| 2,958,039 | 10/1960 | Anderson. |
| 3,145,341 | 8/1964 | Andrew. |
| 3,185,958 | 5/1965 | Masterson et al. _ _ _ 235—181 X |
| 3,216,013 | 11/1965 | Thor _ _ _ _ _ _ _ _ _ _ _ _ 343—17.2 |
| 3,219,994 | 11/1965 | James _ _ _ _ _ _ _ _ _ _ _ 235—197 X |

MALCOLM A. MORRISON, *Primary Examiner.*

I. KESCHNER, J. F. RUGGIERO, *Assistant Examiners.*